Patented Jan. 13, 1942

2,269,521

UNITED STATES PATENT OFFICE 2,269,521

PLASTIC PRODUCT AND METHOD OF MANUFACTURE

William A. Darrah, Chicago, Ill.

No Drawing. Application February 1, 1940,
Serial No. 316,815

2 Claims. (Cl. 41—19)

This invention relates to various types of plastic products and particularly to means of obtaining an extremely attractive surface effect which greatly improves the appearance.

There has long been a search for an attractive method of giving sparkle and color to transparent products both for use and for decoration. Cut glassware, mother-of-pearl finishes and similar devices have been used to give sparkle and brilliance to articles made of glass and other plastics. As far as the writer knows the invention disclosed herewith gives a finish which is superior to any of the present devices employed, and is easily and cheaply obtained.

The object of this invention therefore is to provide an article which will have unusual and beautiful surface color effects and will therefore be very attractive, while at the same time is economical to make. My inveniton therefore covers both an article of manufacture and the process by which it may be made.

The class of articles to which this invention applies is quite broad. In general most of the materials from which my inveniton may be fabricated may be known as thermo plastics which include such substances as glasses and related products, synthetic and natural resins and products formed from them; also cellulose products, gypsum and various plastics such as magnesium oxy-chloride and oxy-sulphate.

It should be understood that I am referring to the various groups specified above when I use the general term "plastic" in a sense that it is a moldable material. In many cases the molding is most conveniently accomplished by hot pressing in which case of course the product is a thermo plastic but my invention is also broad enough to include those products which set by drying or by chemical reactions such as plasters, magnesium oxy-sulphate and oxy-chloride cement, etc.

It is of course well known that by pressing in a rigid mold as for example one made of steel, plastic material under the proper conditions of temperature and pressure will be shaped to conform to the mold.

I have found however that by ruling a number of lines along the surface of the mold, the lines being relatively close together, that it is possible to imprint these lines on the surface of the plastic article and when the lines are very numerous as for example around 7000 or so per lineal inch the resultant surface becomes iridescent, and exhibits the colors of the spectrum. If the surface is curved either slightly or very pronouncedly the effect is much more impressive as various spectrum colors flash over the surface as it is moved in relation to a source of light and the eye which views it.

If, in addition to having a surface which is curved, it does not all lay in one plane, or the plastic of itself has a basic color or a variety of basc colors, still further startling and attractive effects are produced.

In specifying that the surface is preferably curved I wish to imply that it is preferably disposed in more than one plane in order to obtain the most attractive effects. The transposition from one plane to another, may be in a series of sharp straight surfaces or in a series of curves although I prefer, for the best effects, a curving surface or at least fillets conecting the various surfaces.

It is of course impractical from a commercial standpoint, with present day equipment, to rule lines regularly and accurately on a curved surface, with sufficient precision and at a low enough operating cost to produce the results which I wish.

I have therefore devised a method of constructing the molds for use in forming my plastic article and this method is both simple and relatively inexpensive.

In preparing molds by my process I first rule a section of moderately hard metal or other surface which may be termed a "master spectrum" surface. This master spectrum surface is preferably coated with nickel, chromium or some hard relatively non-corrosive material in order to insure durability.

The master spectrum is then used to form a surface with a similar series of lines on a flexible medium such as rubber, vinyl resin or any suitable product preferably one which is somewhat elastic as well as flexible. This elastic material for receiving the lines may conveniently be in the form of sheets.

These flexible and elastic sheets which now have carried on their face the grating ruling are then arranged in the desired form for the finished article, and if necessary are curved, warped or bent to suit requirements.

For example if it is desired to produce a saucer or plate the flexible and elastic material is curved or formed into the shape of the ultimate product. This may be done sometimes by cutting the elastic material into several smaller pieces or merely by stretching or forming it. It is convenient to bend or form it around a wooden or metal backing which will hold it in the desired shape with sufficient permanence to permit the next operation to proceed.

Some advantages are frequently obtained by arranging the mold and of course therefore the final product so that the various ruled lines are not parallel over the entire surface and I wish to include as one feature of my invention an arrangement in which the grating or ruled lines on the surface are arranged so that the various groups are not all parallel but lay at varying angles.

Having now prepared a model from the plastic material and impressed on its face the gratings, and backed it up with a supporting structure, I now electroplate with iron, copper, nickel or other desired metal a moderately thick layer over the plastic surface.

As an alternate to electroplating I may spray metal or other materials violently on the plastic model but I prefer the electroplating method as a simple convenient copying method.

When the coating has been built up to sufficient thickness (say 1/16" or more) to have substantial strength it is peeled away from the plastic surface of the model. It will be evident that the plating may be carried out by first coating the surface of the model with a thin layer of colloidal graphite, which forms a conducting surface. Other similar materials may be used instead of graphite. This thin graphite layer makes it relatively easy to remove the plated or sprayed metal from the model and at the same time makes the surface a conductor so that plating may take place without difficulty.

The metal surface formed as outlined above will now have the exact contour of the model including the closely spaced lines. It will obviously be immaterial whether the lines are raised or depressed as the thickness of the line is a substantial percentage of the space between the lines.

The metal coating formed as specified above may now be backed up by pouring or forming some other suitable metal or other material against its surface. Bronze or cast iron are suitable materials and these may be made to adhere by proper cleaning and tinning thus reinforcing the ruled surface of the metal mold.

Having now produced a substantial metal mold of the desired contour and containing on its surface the closely ruled lines it is a simple matter to utilize this mold by any of the well known commercial means to form the article desired.

In the case of glass operations the article is preferably formed by hot pressing in the usual method. Blowing may be employed with special provision for pressures. In the case of the various thermoplastics well known commercial molding procedure is followed.

It will be evident that while I have referred to plates or containers this process may be applied to articles having any desired contour or surface, such as all forms of cups, trays, boxes, etc., and various articles for other purposes.

It will be understood that in referring to the term "lines" I am referring to surface conditions which may be either grooves or raised ridges. It will be obvious also that my invention includes by this term a condition which I consider the equivalent of these, that is rows of dots or rows of dashes, etc.

It will be understood that the lines do not have to be straight, although I obtain much more satisfactory results when they are parallel, thus concentric circles or other groups of curving lines fall within the scope of my invention and I prefer to have the groups of parallel lines arranged in different directions as this greatly improves the effectiveness of this surface decoration. The spacing of the lines may be varied to produce different color effects.

It will be understood that these lines are too small to be visible unaided by the ordinary eye and in one form of my invention the surface appears absolutely smooth.

I do not wish to be restricted to any particular spacing or number of lines per given unit. Around 5000 to 9000 lines per inch give quite satisfactory results and are well within the range of commercial manufacture. I prefer around 7000 lines per inch. A fewer number of lines may be used but the results are not so attractive. In the case of using fewer lines I prefer to make the depth of the lines greater.

As previously mentioned I do not wish to be confined to any specific plastic material in carrying out my invention.

Glasses of all types are very desirable, partly because of their hardness and the resulting permanence of the lines.

Many of the so-called synthetic resins are well suited for my purposes as well as many natural gums or resins, or mixtures of them.

Such materials as Celluloid, cellulose acetate, phenol-formaldehyde resin, urea resins, Nylon, vinyl resins, acrylic resins, casein compounds, Manila gums, glyptols, rosin and oil combinations, etc.

It will be evident that my invention is not limited to any special composition of matter. My invention resides rather in the surface condition of a wide variety of materials, and the process of obtaining this condition.

Having now fully described my invention, what I claim is new and desire to secure by Letters Patent in the United States is:

1. An article of manufacture formed from colored plastic material having a curved surface, a portion of said surface being formed with closely spaced groups of curved lines arranged to produce a visible color spectrum effect which varies at different angles of vision and is influenced by the super-imposed color of the plastic base.

2. An article of manufacture formed from colored plastic material having a curved surface on which is formed a group of closely spaced circular lines, arranged to produce a visible color spectrum, different in appearance when viewed from different angles, and tinged with the basic color of the plastic base.

WILLIAM A. DARRAH.